United States Patent
Wagner et al.

(10) Patent No.: US 7,693,686 B2
(45) Date of Patent: Apr. 6, 2010

(54) SENSOR ARRANGEMENT WITH A SENSOR AND A SIGNAL PROCESSING MEANS

(75) Inventors: Dietmar Wagner, Kirchheim (DE); Armin Seitz, Linkenheim (DE)

(73) Assignee: Festo AG & Co. KG, Esslingen (DE)

( * ) Notice: Subject to any disclaimer, the term of this patent is extended or adjusted under 35 U.S.C. 154(b) by 305 days.

(21) Appl. No.: 11/786,664

(22) Filed: Apr. 12, 2007

(65) Prior Publication Data

US 2007/0279118 A1    Dec. 6, 2007

(30) Foreign Application Priority Data

Apr. 20, 2006    (EP)    ................................ 06008148

(51) Int. Cl.
*G01D 5/00* (2006.01)
*G06F 17/00* (2006.01)

(52) U.S. Cl. ........................ 702/185; 702/104; 702/107; 702/193; 73/1.34

(58) Field of Classification Search ................. 702/185, 702/104, 107, 116, 127, 193
See application file for complete search history.

(56) References Cited

U.S. PATENT DOCUMENTS

| | | | | |
|---|---|---|---|---|
| 4,071,886 A | * | 1/1978 | Eicher | 700/28 |
| 4,219,740 A | * | 8/1980 | Little | 307/116 |
| 4,334,183 A | * | 6/1982 | Hauenstein | 323/235 |
| 4,367,534 A | * | 1/1983 | Herbst et al. | 250/201.8 |
| 4,412,581 A | * | 11/1983 | Iversen et al. | 165/240 |
| 4,473,797 A | * | 9/1984 | Shiota | 324/115 |
| 5,543,997 A | * | 8/1996 | Ruprecht | 361/100 |
| 5,818,130 A | * | 10/1998 | Gass et al. | 307/127 |
| 6,246,968 B1 | * | 6/2001 | Wilczek et al. | 702/104 |
| 2007/0103132 A1 | * | 5/2007 | Hendrix et al. | 323/282 |

FOREIGN PATENT DOCUMENTS

| | | |
|---|---|---|
| DE | 31 15 149 | 11/1982 |
| DE | 35 06 705 | 9/1985 |
| DE | 40 18 639 | 12/1991 |
| DE | 93 10 253.4 | 11/1993 |
| EP | 1 203 933 | 5/2002 |

OTHER PUBLICATIONS

IBM, "Optical Disk Read Channel", Mar. 1, 1987, NN87034297, IBM Technical Disclosure Bulletin, vol. 29, issue 10, 4 pages.*

* cited by examiner

*Primary Examiner*—Hal D Wachsman
(74) *Attorney, Agent, or Firm*—Hoffmann & Baron, LLP

(57) ABSTRACT

A sensor arrangement comprises a sensor responsive to a measurement parameter as a sensor signal and a signal processing means for the sensor signal, the signal processing means having a switching stage for comparison of the sensor signal with a comparison or switching value and for producing a switching signal in a manner dependent on the comparison. A functional stage is present, which constitutes one function of the sensor signal, is comprised in the signal processing means, such function including a time derivative of the sensor signal or a sensor signal value modified by an additive factor, and the output signal of the functional stage forming the comparison of switching value for the switching stage.

15 Claims, 3 Drawing Sheets

US 7,693,686 B2

SENSOR ARRANGEMENT WITH A SENSOR AND A SIGNAL PROCESSING MEANS

CROSS-REFERENCE TO RELATED APPLICATIONS

This application claims priority to European Application Serial No. EP 06008148.6, filed Apr. 20, 2006.

BACKGROUND OF THE INVENTION

The invention relates to a sensor arrangement comprising a sensor responsive to a measurement parameter as a sensor signal and a signal processing means for the sensor signal, the signal processing means having a switching stage and a function stage. The switching stage compares sensor signal with a comparison or switching value produced by the function stage and produces a switching signal in a manner dependent on the comparison.

THE PRIOR ART

In such a sensor arrangement as disclosed in the European patent publication EP-A-1203933 the comparison or switching value can be remotely parameterized. Nevertheless the switching signal depends exclusively on its comparison and switching value and does not cater for any functions going beyond this.

Such additional functions are frequently required in automation technology and in a known manner are produced by sensors with an analog output, analog input modules and complex signal processing system (SPS) programming.

BRIEF SUMMARY OF THE INVENTION

One object of the present invention is to so design a sensor arrangement that processed binary switching signals, more particularly for process control, may be simply produced, which comprise not only parameter functions dependent on the comparison and switching value but also further parameters.

In order to achieve this or other aims appearing in the following specification and claims in the invention a functional stage, which forms one function of the sensor signal, is comprised in the signal processing means, such function including a time derivative of the sensor signal or a sensor signal value modified by an additive factor, and the output signal of the functional stage forming the comparison or switching value for the switching stage or forming a turn-off/turn-on signal for the switching signal.

The advantages of the sensor arrangement in accordance with the invention are in particular that processed binary switching signals are simply produced, which are not only dependent on measurement parameters but also comprise further desired functions of the measurement parameter or of other parameters. Correspondingly complex programming of a conventionally analog sensor output signal is no longer necessary.

The switching stage is preferably in the form of a comparator and more especially a window comparator.

In accordance with a first advantageous development of the sensor arrangement the function stage involves a differential stage forming the first or the second time derivative of the sensor signal and a threshold value stage for the output signal of the differential stage, whose output signaling in turn forms the turn-off or turn-on signal for the switching signal. For this purpose a turn-off and turn-on stage, more particularly in the form of an AND gate, for the switching signal may be acted upon by the turn-off/turn-on signal as a control signal. In the case of one design of the switching stage as a window comparator a switching signal is only produced, when a signal change, taking place in this range lies below an adjustable limit value.

In accordance with a further advantageous design of the sensor arrangement the function stage comprises a differential stage for producing the time derivative of the sensor signal and a function part stage for producing the function $s_0 - k*s'$, the output signal of the function part stage forming the comparison or switching value, $s_0$ being a preset measurement parameter limit switching value and k being a predetermined factor. If for example as a predetermined measurement parameter-threshold switching value a switching position value triggering a further switching operation is selected, then it is possible to produce, in a manner dependent on rate, a triggering point in time, for the further operation just prior to reaching such switching position.

In accordance with a further advantageous embodiment the function stage includes a memory stage for the sensor signal at a predetermined point in time and an adding stage for the addition of the stored sensor signal of the addition stage to an offset value, the output signal of the addition stage forming the comparison or switching value. In the case of this design a position signal is for example stored when a particular event occurs in the memory stage and then added to the offset value, the switching signal being triggered on reaching this function value.

As a measurement parameter use may for example be made of a position or a movement or a pressure or a forced or a or a flow through in a system.

Three working examples of the invention are illustrated in drawing and will be explained in the following description in detail.

DETAILED ACCOUNT OF WORKING EMBODIMENTS OF THE INVENTION

Figure 1:
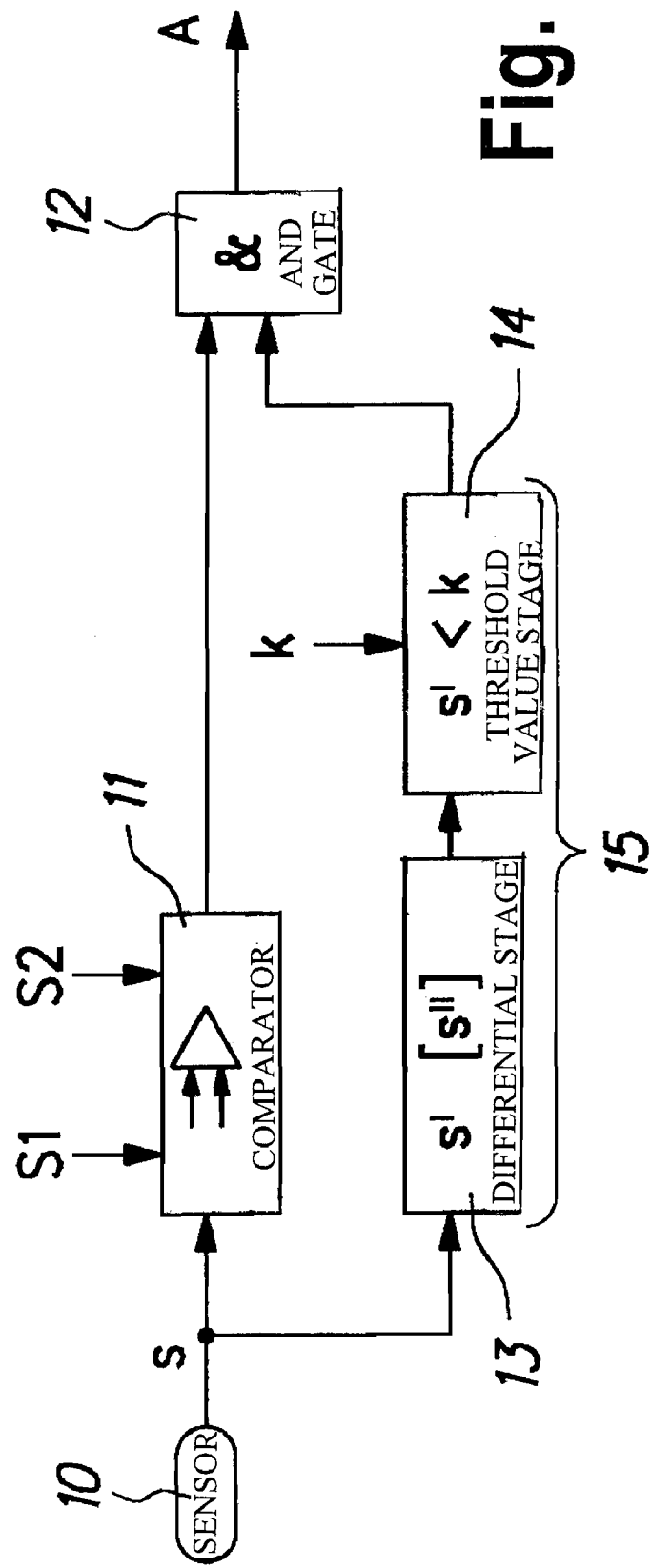
FIG. 1 represents a first working example shown as a block circuit diagram comprising a differential stage and a threshold value stage as a function stage.

In the sensor arrangement depicted in FIG. 1 a sensor 10 is connected by way of a window comparator 11 with an input of an AND gate 12, such sensor 10 being responsive to a measurement parameter such as a position, a movement, a pressure or a force or some other parameter. Furthermore the output of the sensor 10 is connected by way of a differential stage 13 for forming a first time derivative s' of the sensor signal s and a threshold value stage 14 producing an output signal when the value of the first derivative s' is smaller than a predetermined limit value k. The differential stage 13 forms, together with the threshold value 14, a function stage 15. The output signal of the threshold value stage 14 is applied to the second input of the AND gate 12 and forms a turn-off signal or, respectively, a turn-on signal for the output signal of the window comparator 11, which in the case of a turn-on, i. e. in the case of a signal at the output of the threshold value stage 14, produces a digital switching signal A at the output of the sensor arrangement.

The differential stage 13 can also be designed to form the second time derivative s" of the sensor signal s. Moreover, the threshold value stage 14 may be differently configured dependent on the individual case of application, for example to also produce an output signal, when a limit value k is exceeded or when the first and the second derivative lies between two limit values. As an alternative to an AND gate 12 it is as well possible to employ a different turn-off and turn-on stage, which, in a fashion dependent signal of the threshold value stage 14, turns off or turns on.

A practical application for the working example depicted in FIG. 1 is for example a gripper application. The sensor 10 measures the position of the gripper, as for example the distance apart of the gripper's jaws. On gripping a component the gripper travels into a position, which lies between the positions S1 and S2 as threshold positions of the window comparator 11. Once the gripper has taken hold of the component, its speed will approach zero and will therefore be below the threshold value of k. Since the position is within the window range of the window comparator 11, a switching signal A results, which indicates the true position of the gripper on the component.

However in the case of faulty operation of the gripper and it fails to grip a component it will transcend the window range at a rate above the threshold value of k so that an inappropriate switching signal is prevented which otherwise might initiate a chain of inappropriate process steps.

A further application for the working embodiment depicted in FIG. 1 is monitoring leaks in a fluid sensor system. In this case the sensor 10 is in the form of a pressure sensor. If in a set pressure window the window comparator 11 additionally evaluates the rate of change in the pressure signal, this will lead to a qualitative conclusion as regards the fluid tightness of a component. The maximum permissible leak rate may then be set by way of threshold value k.

Figure 2:
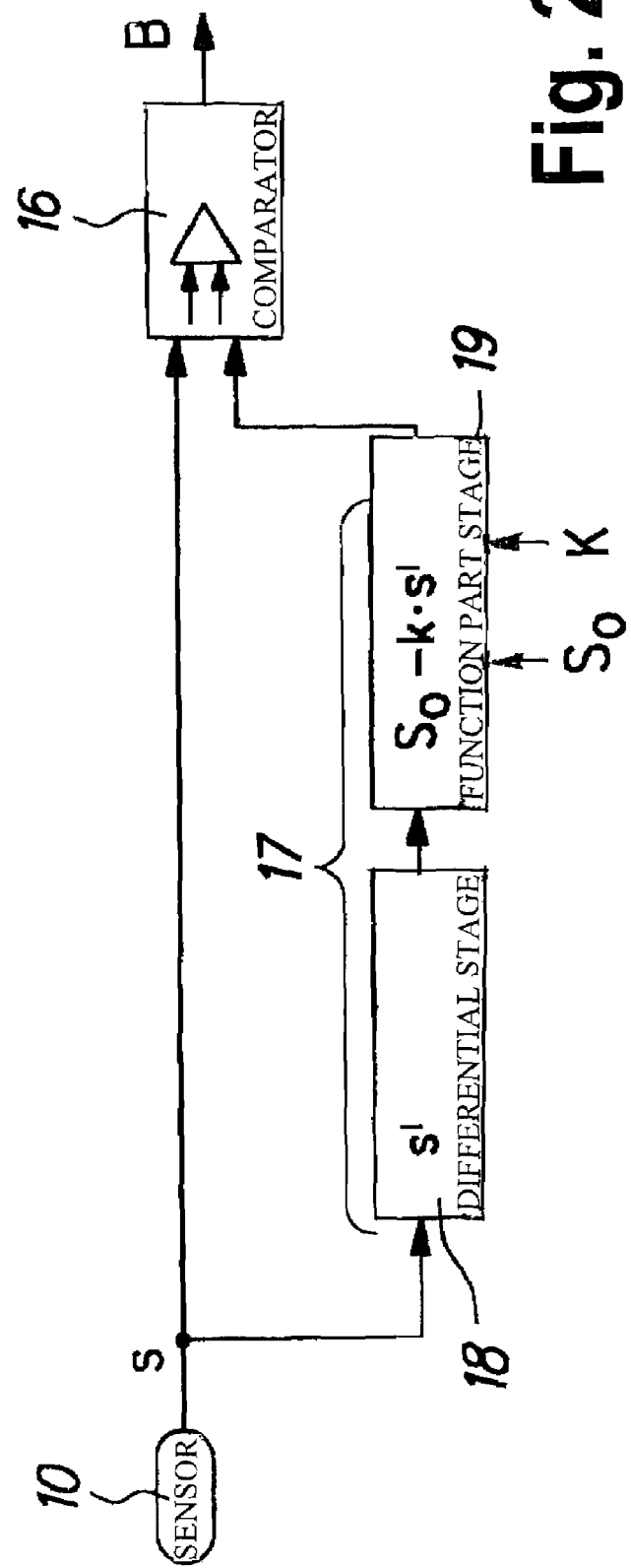
FIG. 2 shows a second working example as a block circuit diagram comprising a differential stage and as a function stage a function part stage, forming a function of the time derivative.

In the case of the second working example represented in FIG. 2 the sensor 10 linked both directly with one input of a comparator 16 and also by way of a function stage 17 with the second input of such comparator 16. The function stage 17 comprises a differential stage 18 to form the first time derivative s' of the sensor signal s a function part stage 19 to form the function $s_0 - k*s'$, wherein $s_0$ is a predetermined measurement parameter threshold switching value and k is a predetermined factor. $s_0$ and k may be applied to the function part stage 19 in a variable manner or may be stored in a fixed or adjustable manner.

On the output side the comparator produces a digital switching signal B, if the sensor signal is the same as the output signal of the function stage 17. In this case the comparator 16 may for example also be in the form of a threshold value stage, whose threshold value is predetermined by the output signal of the functional stage 17.

One possible application for the second working embodiment in practice is for example optimizing stroke rate for position dependent handling presses. In this case process operations are to be optimized and the stroke rate also increased. For instance two cylinders Z1 and Z2 are to perform different tasks in automated operations, with the tasks being implemented one after the other. A switching signal at the cylinder Z1 triggers the operation at the cylinder Z2. In order now to compensate for idle times due to signal transit times, valve switching times, pressure build up or the like, the operation at the cylinder Z2 is to be triggered just prior to the point in time at which the cylinder Z1 reaches its terminal or starting position. In this case the rate of speed change of the cylinder Z1 or its piston is monitored directly prior to the switching point for triggering the cylinder Z2 and the rate processed by the functional stage 17. The rate of speed change is multiplied by the factor k, which is not dependent on any other one of the factors and accordingly additionally it is permissible to adapt the prefix of the switching point in a manner specific to the system. The size of the product k*s' accordingly determines the degree to which the switching point may be advanced, i. e. how much earlier the signal B starting the operation at the cylinder 22 is to be produced. The measurement parameter threshold value so in this case corresponds to that position of the cylinder Z1 at which in fact, that is to say without the prefix of the switching, the cylinder Z2 must be triggered.

A further application for the second working example is stroke rate optimization in fluid power systems, for example in the case of filling operations in fluid sensor systems. For this purpose the sensor 10 is in the form of a flow rate 2 and continuously registers the filling operation. If in this case the change in the rate of filling is monitored, then it is possible, even prior to the actual use switching point, which halts the supply of a gas after reaching a certain minimum volume, to start the following operations respectively earlier and accordingly to start with an optimized stroke rate.

Figure 3:
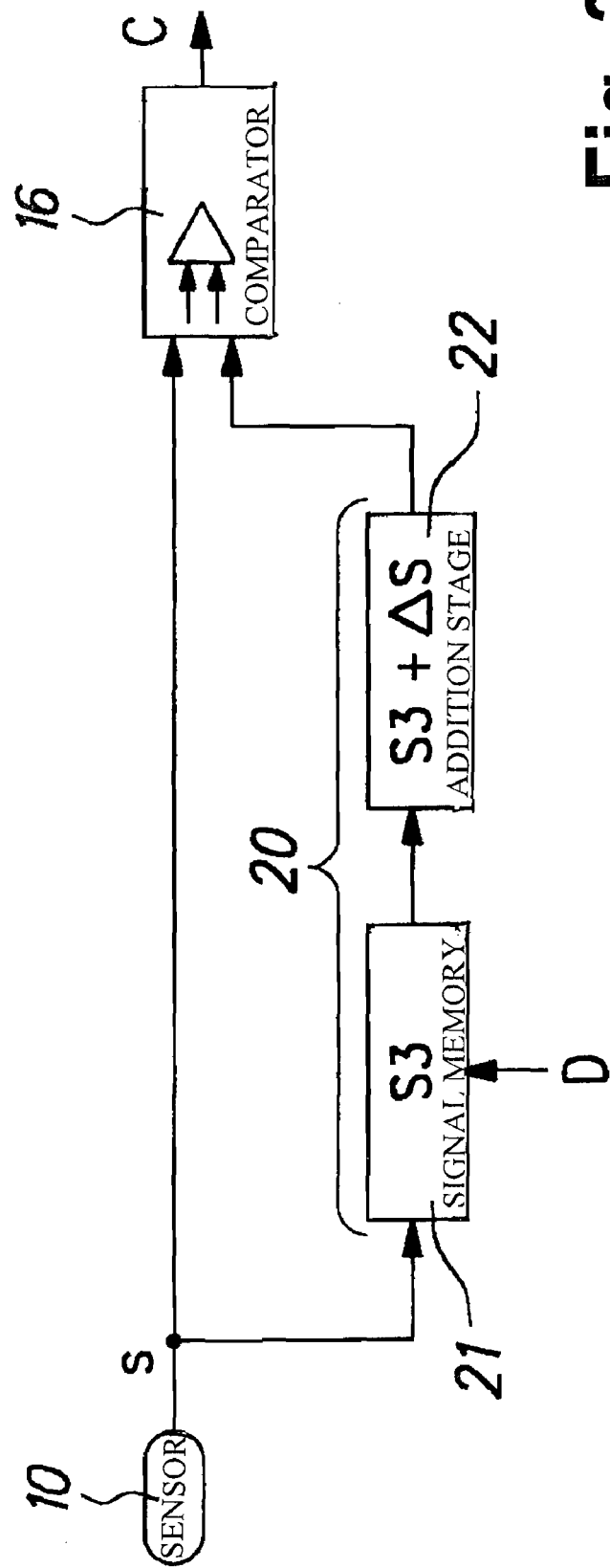
FIG. 3 shows a third working example of the invention as a block circuit diagram comprising a memory stage and an addition stage as a function stage.

In the case of the third working example, depicted in FIG. 3, of the sensor arrangement the sensor 10 is connected both directly with an input of the comparator 16 and also by way of a functional stage 20 with the second input of the comparator 16. The functional stage 20 in this case comprises a signal memory 21 and an addition stage 22 for the addition of the stored value held in the signal memory stage 21 to an offset value As. The signal memory stage 21 holds the respectively applied sensor signal s as the stored value s3, when a storage signal D is applied as a trigger signal for the storage operation. As was the case with the second working example a switching signal C is produced at the output side, if the sensor signal s is the same s the output signal of the functional stage 20, or, respectively, reaches the level of such signal.

One application in practice is ultrasonic welding using a sonotrode. In the case of many welding operations a sonotrode firstly has to engage the workpiece to be welded before then, in the welding operation as such, the sonotrode squeezes the workpieces to be welded through a defined distance Δs. In a practical application the sonotrode therefore travels as far as the abutment position S3, which is subject to tolerances and at which operation itself is started by a switching signal D. The welding operation is then terminated on reaching a position S3+Δs. The quality of the weld depends substantially of the squeeze depth Δs of pressing. In the working embodiment illustrated in FIG. 3 the position signal S3 is stored on reaching by the signal D. When the position S3+Δs is reached the comparator 16 is switched and produces the switching signal C, by which the welding process is terminated. Accordingly a weld of constant quality is ensured. The signal D triggering the storage operation on reaching the engagement position may produced in accordance with the first working embodiment, for example.

A further case of application for the third working example is constituted by force-dependent press fitting operations, as for example in the case of assembly presses. A press fitting operation typically takes place in two steps. In a first step the respective part is positioned and in the second part is then press fitted with a predetermined force. In the first step, owing to tolerances, or, respectively, different opposing forces there is a biasing force S3, which may then be detected by the sensor 10 designed in the form of a pressure sensor. Starting with this pressure S3 the actual press fitting operation is then effected with an additional press fitting force Δs. This set of operations may be effected in a simple manner in the third working example.

The above described sensor arrangements may be integrated in a sensor module, which for example is connected with an SPS with a binary input. Alternatively the electronic components with the exception of the sensor 10 may be integrated in a separate device or in the SPS or in another control means.

The above described functional blocks in the sensor arrangements described may for example be effected by functions in a microcontroller.

The invention claimed is:

1. A sensor arrangement comprising:
a sensor producing a sensor signal in response to a measurement parameter; and
a signal processing means for the sensor signal, said signal processing means having a switching stage and a functional stage, said switching stage comparing the sensor signal with an output signal produced by the functional stage and producing a switching signal dependent on the comparison, wherein said functional stage includes a differential stage and a threshold value stage, said differential stage forming a first time derivative of the sensor signal, and said threshold value stage comparing said first time derivative of the sensor signal to a threshold value and generating said output signal depending on said comparison of the first time derivative of the sensor signal to the threshold value.

2. The sensor arrangement as set forth in claim 1, wherein the switching stage comprises a window comparator.

3. The sensor arrangement as set forth in claim 1, wherein the differential stage further forms a second time derivative of the sensor signal and wherein the output signal of the threshold value stage is used to form a turn-off or turn-on signal by the switching stage.

4. The sensor arrangement as set forth in claim 1, wherein the switching stage comprises an AND gate.

5. The sensor arrangement as set forth in claim 1, wherein the output signal of the threshold value stage is used to produce a turn-on signal by the switching stage when a value of the first time derivative is below the threshold value.

6. The sensor arrangement as set forth in claim 1, wherein the measurement parameter is in the form of a position or a movement or a pressure or a force or a flow rate.

7. A sensor arrangement comprising:
a sensor producing a sensor signal in response to a measurement parameter; and
a signal processing means for the sensor signal, said signal processing means having a switching stage and a functional stage, said switching stage comparing the sensor signal with an output signal produced by the functional stage and producing a switching signal dependent on the comparison, wherein said functional stage comprises a differential stage and a function part stage, said differential stage forming a first time derivative ($s'$) of the sensor signal and said function part stage forming the function $s_0 - k \times s'$, and generating the output signal of the functional stage based on said function, $s_0$ being a predetermined measurement parameter limit switching value and k being a predetermined factor.

8. The sensor arrangement as set forth in claim 7, wherein the switching stage comprises a window comparator.

9. The sensor arrangement as set forth in claim 7, wherein the switching stage comprises an AND gate.

10. The sensor arrangement as set forth in claim 7, wherein the measurement parameter is in the form of a position or a movement or a pressure or a force or a flow rate.

11. A sensor arrangement comprising:
a sensor producing a sensor signal in response to a measurement parameter; and
a signal processing means for the sensor signal, said signal processing means having a switching stage and a functional stage, said switching stage comparing the sensor signal with an output signal produced by the functional stage and producing a switching signal dependent on the comparison, wherein the functional stage includes a memory stage for storing the sensor signal at a predetermined point in time and an addition stage for adding the sensor signal stored in the memory stage to an offset value, the addition stage generating the output signal of the functional stage based on said addition.

12. The sensor arrangement as set forth in claim 11, wherein said predetermined point in time for storing said sensor signal in said memory stage is determined by a trigger signal received by said memory stage upon detection of a predetermined measurement parameter being reached.

13. The sensor arrangement as set forth in claim 11, wherein the switching stage comprises a window comparator.

14. The sensor arrangement as set forth in claim 11, wherein the switching stage comprises an AND gate.

15. The sensor arrangement as set forth in claim 11 wherein the measurement parameter is in the form of a position or a movement or a pressure or a force or a flow rate.

\* \* \* \* \*